United States Patent
Champaigne

(12) 
(10) Patent No.: US 6,289,713 B1
(45) Date of Patent: *Sep. 18, 2001

(54) METHOD OF CALIBRATING GAGES USED IN MEASURING INTENSITY OF SHOT BLASTING

(75) Inventor: Jack M. Champaigne, South Bend, IN (US)

(73) Assignee: Electronics Incorporated, Mishawaka, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 09/234,599

(22) Filed: Jan. 21, 1999

(51) Int. Cl.$^7$ .................. G01B 3/30; G01B 5/30
(52) U.S. Cl. ............................. 73/1.79; 33/502
(58) Field of Search ................ 73/1.79, 1.81, 73/1.75, 1.01, 11.02; 33/567, 567.1, 504.15, 502

(56) References Cited

U.S. PATENT DOCUMENTS

| | | | |
|---|---|---|---|
| 2,350,440 | * 6/1944 | Alman | 73/11.02 |
| 5,297,418 | 3/1994 | Champaigne | 73/11.02 |
| 5,780,714 | 7/1998 | Champaigne | 73/1.79 |
| 5,877,405 | 3/1999 | Champaigne | 73/11.02 |

* cited by examiner

*Primary Examiner*—Thomas P. Noland
(74) *Attorney, Agent, or Firm*—Ken C. Decker; James D. Hall

(57) ABSTRACT

A method for calibrating a gage for measuring shot blast intensity having an indication mounted on a platform adjusts the calibration of the indicator to compensate for variations of positioning of the Almen test strip supports on the platform. After verifying that the test strip supports are within tolerance by use of "go-no go" gages, the indicator is mounted on the support and calibrated by using a notch calibration block to first set the zero datum of the indicator and then to make a calibration reading of the depth of the notch. If the reading is within specifications, the notched calibration block is removed, and a calibration block having a curved surface simulating the curvature of an Almen strip to be measured by the Almen gage and having a known maximum deflection is installed on the gage and the indicator used to measure the deflection. If the measured deflection is within tolerance limits of the known actual deflection, the indicator is recalibrated to read the actual deflection. By calibrating gages in this manner, all gages at a facility which have been calibrated by using the same calibration blocks will read the same, thus eliminating inconsistencies between gages.

10 Claims, 3 Drawing Sheets

METHOD OF CALIBRATING GAGES USED IN MEASURING INTENSITY OF SHOT BLASTING

BACKGROUND

This invention relates to an improved apparatus and a method used for the calibration of Almen gages used in measuring the intensity of shot blasting.

Gages of the general type disclosed in U.S. Pat. No. 2,350,440 (Almen), commonly referred to as "Almen gages," have been used for many years to measure the intensity of shot blasting. Almen gages measure the curvature of thin metal test strips after one side of the strips have been exposed to shot particles. A measurement is effected by measuring the displacement of the center of the test strip with respect to a zero datum. Almen gages are precision instruments and must be extremely accurate. Accordingly, Almen gages must be properly calibrated when manufactured and must be recalibrated on a regular basis. Since the purpose of the Almen gage is to provide uniformity in the shot peening process, it is desirable that gages used to measure the process should have as little variation from gage to gage as possible. It is common in shot peening operations for a shop to have multiple Almen gages, which are used interchangeably. However, different gages may have different readings, due to tolerance stack Almen gages consist of a platform and a digital or analog indicating device which is mounted on the platform. Present practice is to separately calibrate the indicating device and the platform. The platform includes a measurement surface which includes a semispherical elements extending from the measurement surface to support the Almen strip and four posts engaging edges of the Almen strip to properly locate the Almen strips in the measurement position. Since the accuracy of the Almen gage is a direct function of the placement of the semispherical projections and the posts, proper placement of these elements must be verified within strict tolerances, usually by highly sophisticated coordinate measuring devices. Similarly, the indicator must be calibrated to within tight tolerances. However, since the indicator and the platform may be anywhere within the allowed tolerances, significant differences in readings gage-to-gage may occur. As discussed above, particularly in shops using multiple gages, it is highly desirable that these variations be minimized.

SUMMARY

The present invention adjusts the calibration of the indicator to compensate for variations in the platform. Accordingly, the placement of the locators for the test strip may be verified by the use of simple "go-no go" gages instead of by complicated and expensive coordinate measuring machines. Instead of calibrating the indicator before assembly on the platform, the indicator may be calibrated after assembly to the test platform. A curved calibration block, which is curved to correspond to a known deflection representing the deflection of a typical test strip, is then installed on the platform and the indicator is calibrated to read the known deflection. Accordingly, the indicator is calibrated to compensate for any inaccuracies in the placement of the test strip locating and supporting elements.

BRIEF DESCRIPTION OF THE DRAWINGS

These and other advantages of the present invention will become apparent from the following description, with reference to the accompanying drawings, in which.

DETAILED DESCRIPTION

Figure 1:
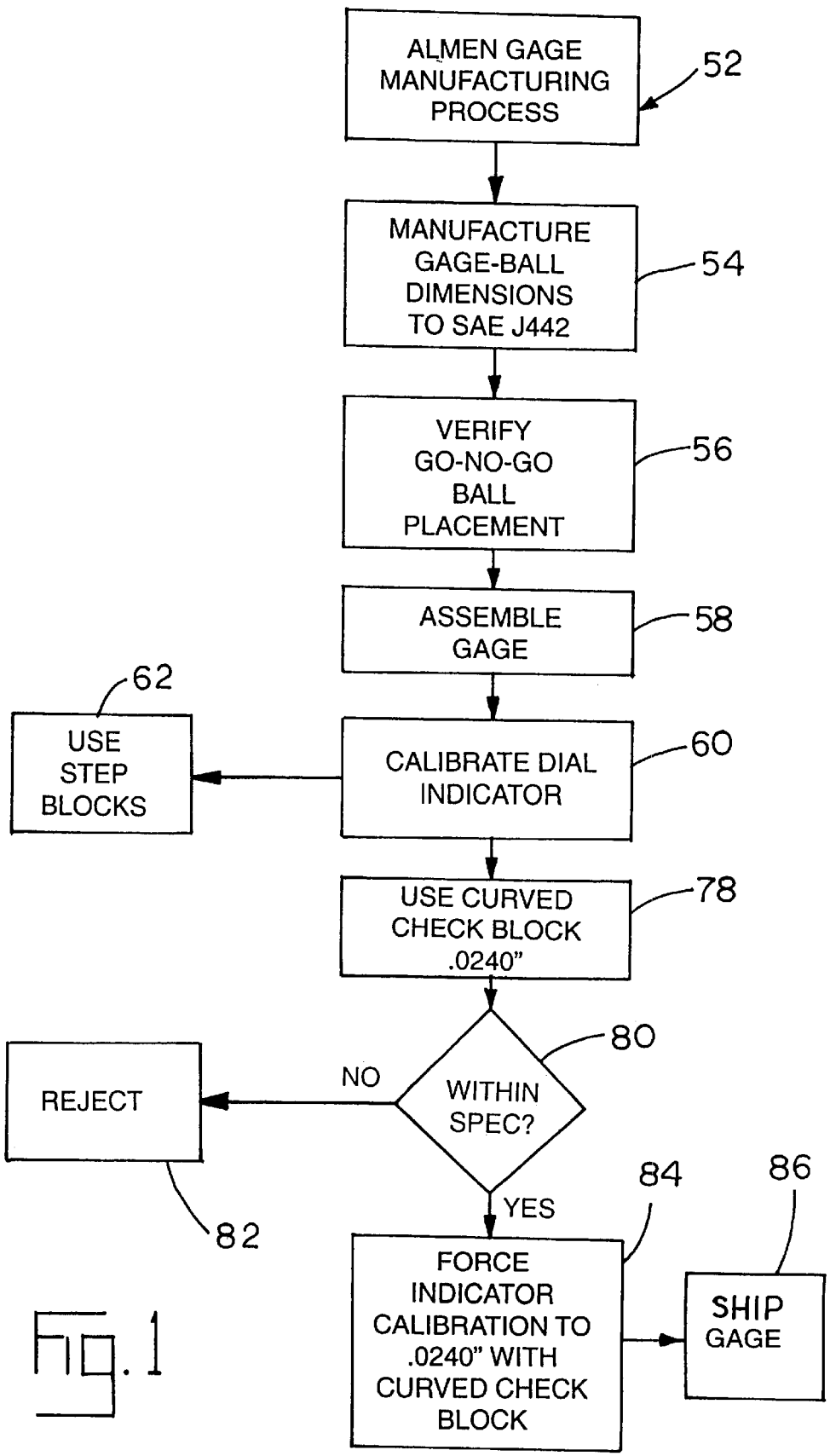
FIG. 1 is a block diagram illustrating the steps used in the method of the present invention for calibrating Almen gages.
Figure 2:
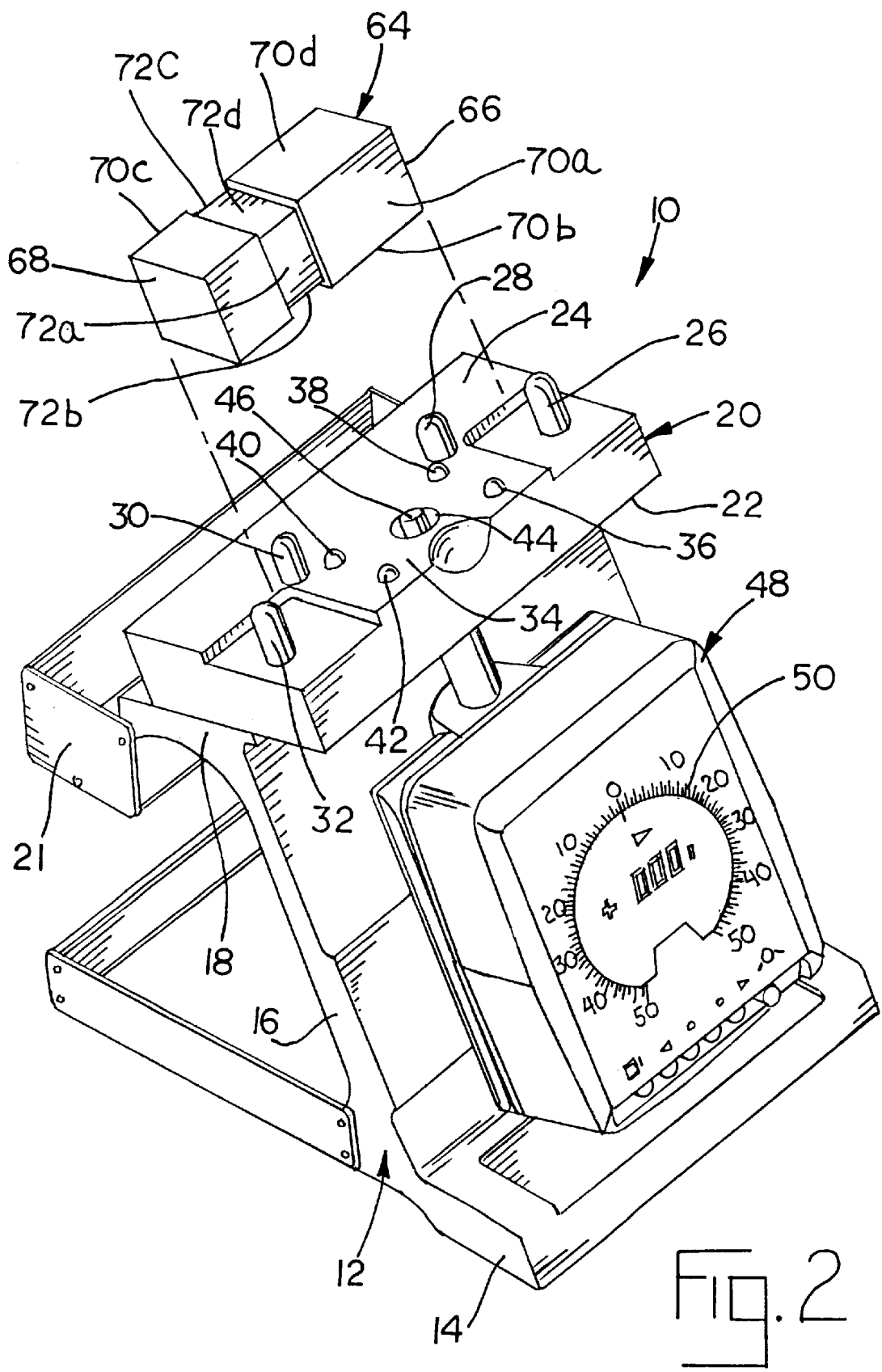
FIG. 2 is a view in perspective of a typical Almen gage which is to be calibrated using the method of the present invention with a notched calibration block lifted off of the test strip measuring surface thereof.
Figure 3:
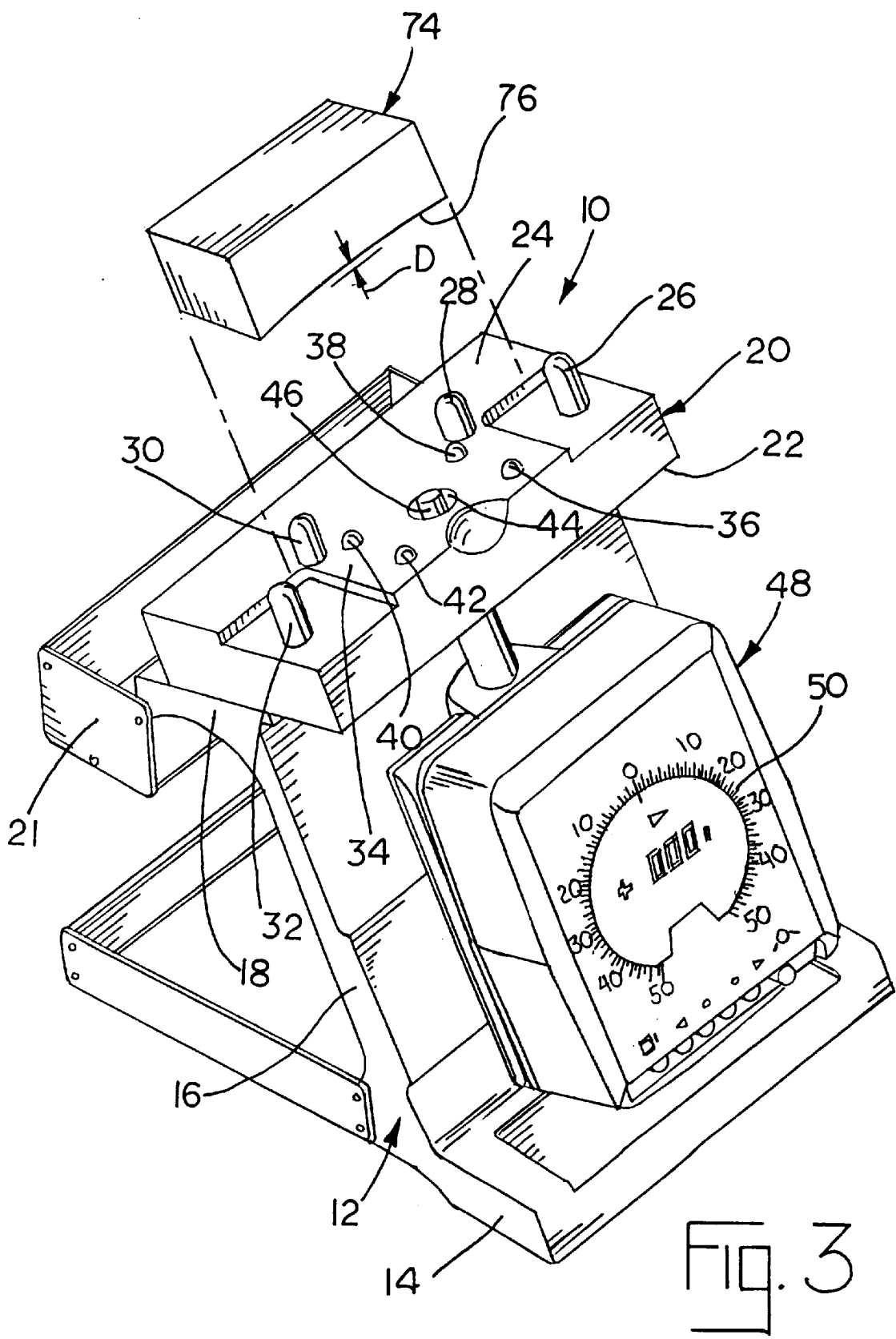
FIG. 3 is a view similar to FIG. 2 but illustrating a test block having an arcuate measuring surface in combination with the Almen gage.

Referring now to FIGS. 2 and 3 of the drawings, the construction of the Almen gage generally indicated by the numeral 10 will be described in detail before describing the process used to calibrate the Almen gage in connection with FIG. 1. The gage 10 includes a stand 12 with a lower support base 14 and a back 16 extending generally upwardly from the support base 14 and terminating in a generally flat surface 18 upon which a test platform 20 is mounted. A tray 21 is mounted on the test stand 12. Test strips (not shown) can be stored within the tray 21 for convenient access during testing.

Test platform 20 includes a lower surface 22 which is secured to the surface 10 and an opposite upper surface 24. Four alignment posts 26, 28, 30 and 32 project upwardly from upper surface 24. The posts 26–32 are used to align the ends of a test measurement strip (not shown) when a measurement is to be made. Accordingly, the posts 26–32 define a measurement surface 34 on upper surface 24 of the test platform 20. Semi-spherical surfaces 36, 38, 40 and 42 extend upwardly from test surface 34. A test strip (not shown) is held against the spherical surfaces 36–42 by magnetic forces when a test measurement is made. An aperture 44 extends through the test platform 20 and receives a reciprocating plunger or feeler generally indicated by the numeral 46. The plunger 46 is a part of a conventional indicator generally indicated by the numeral 48. The distance plunger 46 moves is reflected on indicator 50 in the face of indicator 48. The plunger 46 is springloaded upwardly as in FIG. 1 and contacts the aforementioned test strips to provide a measurement of the amount of curvature of the test strips above the upper surfaces of the spherical surfaces 36–42, in the conventional manner well-known to those skilled in the art.

As discussed above, prior art Almen gages have in the past been manufactured by first manufacturing the stand 12 and separately manufacturing the indicator 48. The indicator 48 was calibrated before installation on the stand, and the placement of the semispherical surfaces 36–42 and posts 26–32 was verified by coordinate measuring apparatus. Even though the placement of the posts and semispherical support surfaces is within tolerance, and even though the indicator 48 is within tolerance, the assembled gage, when measuring the same Almen strip, may have significant variations with other gages which are similarly calibrated. Accordingly, it is desirable to assure consistency of measurements gage to gage.

Accordingly, the gage 10 is manufactured and calibrated according to the Almen gage manufacturing process generally indicated by the numeral 52 in FIG. 1. The stand 12 is manufactured, as indicated at 54, with the surfaces 36–42 and posts 26–32 having dimensions as established in SAE specification J442. The placement of the semispherical surfaces 36–42 and posts 26–32 is, as indicated at 56, verified by "go-no go" gages in a manner well known to those skilled in the art. The go-no go gages are used instead of the more accurate coordinate measuring devices used in the prior art. The indicator 48 is manufactured separately, but not calibrated until it is installed on the stand 12, as indicated at 58. The indicator 48, as indicated at 60, is calibrated using the procedures disclosed hereinafter and in U.S. Pat. No. 5,780, 714, as indicated at 62.

The dial indicator 48 is calibrated using the step block generally indicated at 64. Step block 64 has a length somewhat less than the length of a conventional test strip (not shown). For example, the length of a conventional test strip is three inches; the length of the calibration block 64 is two inches. The width and height of the calibration block 64 are each equal to the width of the test strips. Accordingly, the block 64 is placed on test surface 34 with one end 66 of the block in engagement with the post 26. Since the length of the test block 52 is less than the length of the test strip, block 64 may be shifted relative to the test surface 34 from a position in which the end 66 engages the post 26 to a position which the opposite end 68 engages the post 32.

The sides of the test block define test surfaces 70*a*, 70*b*, 70*c* and 70*d*. Each of the test surfaces 70*a–d* include a flat portion with a notch 62*a*–62*d* of a known, precisely controlled depth relative to the flat surface. The depth of the notch is different for each of the test surfaces 70*a–d*. When the block 64 is in a position with surface 68 engaged with the post 32, the flat surfaces of each measuring surface is disposed over the plunger 46. When the block is shifted such that the end 66 engages the post 26, the corresponding notch 62*a*–62*d* is disposed over the plunger 46. In both cases, the plunger is supported by the semispherical surfaces 36–42, the block 64 being sufficiently long that it extends over the furthest semispherical surfaces when it is engaged with either the post 26 or 32.

Accordingly, when calibration of the gage 10 is to be effected as indicated at 60 and 62 of FIG. 1, one of the faces of the test block 64 is selected for calibration and that face is placed on the semispherical surfaces 36–42 with the end 66 thereof engaged with the post 26, such that the flat portion is disposed over the indicating plunger 46. The indicator 48 is then "zeroed out" against this zero datum surface. The block 66 is then shifted such that end 68 is engaged with post 32, thereby disposing the corresponding notch of known 62*a*–62*d* over the plunger 46. A calibration measurement is then read and then compared with the known depth of the notch. As pointed out in U.S. Pat. No. 5,780,714, this known depth is with respect to a known zero datum surface. Since notches 62*a*–62*d* have been provided with known depth, additional calibration measurements of varying depths may be made. This calibration measurement must be within tolerance.

Referring to FIG. 1, after the indicator 48 is calibrated as indicated in 60–62, the test block 64 is removed and replaced by test block generally indicated by the numeral 74. The test block 74 is the same length and width of a test strip and is provided with a curved lower surface 76 that simulates the deflection of a test strip to be measured on the test end 10. The curved lower surface 76 has a maximum deflection D of a standard test dimension, for example, 0.024 inch. The curved block 74 is placed on the test measurement plane established by surfaces 36, 38, 40 and 42, as indicated at 78 in FIG. 1, and the indicator 48 is used to read the deflection D as indicated at 80. If the deflection read is not within specification, the gage is rejected as indicated at 82. If the reading is within the specifications, the reading of the gage is adjusted, as indicated at 84 in FIG. 1, in a conventional manner to read the deflection D of the test block 74; in this case the reading will be 0.024 inch. The gage is then approved and shipped as indicated at 86. Accordingly, all gages which use the same calibration blocks will read the same. By setting the indicator 48 to read the known deflection of the block 74, the calibration of the indicator 48 is adjusted to automatically compensate for any small (within tolerances) misalignment of the surfaces 36–42 and the ports 26, 28 30 and 32.

From time to time when the Almen gages are used, the Almen gages must be recalibrated. If the same test blocks 74 and 64 are available, the Almen gage may be recalibrated at any time by repeating the procedures set forth at 60–86 of FIG. 1. If any facility uses multiple gages, each of the gages will read identically when used to measure the deflection of the same test strip.

What is claimed is:

1. Method of calibrating shot blasting test gage used to measure intensity of shot blasting against an elongated test strip, said gage including a stand carrying a platform defining a measurement surface supporting said test strip in a measuring position, locating means placed on said test surface for locating said test strip in said measuring position, and an indicator mounted on said stand for measuring deflection of said strip at a measurement position within said measuring location, wherein the accuracy of the deflection measurement is a function of the accuracy of the indicator and the accuracy of placement of the locating means, comprising the steps of calibrating said indicator while the indicator is mounted on the stand, and then adjusting the calibration of the indicator to compensate for variations in the placement of the locating means.

2. Method of calibrating shot blasting test gage as claimed in claim 1, wherein the calibration of the indicator is adjusted by placing a test member having a known deflection in said measurement position and then adjusting the indicator to read the deflection of the test member.

3. Method of calibrating shot blasting test gage as claimed in claim 2, wherein said test member is a block having an arcuate surface on one face thereof, said arcuate surface establishing said known deflection.

4. Method of calibrating shot blasting test gage as claimed in claim 3, wherein said step of calibrating the indicator includes the step of placing a substantially flat zero datum surface in said measurement position and then zeroing out the indicator with the flat surface in the measurement position.

5. Method of calibrating shot blasting test gage as claimed in claim 4, wherein the step of calibrating the indicator includes the additional steps of supporting a test block having a flat support surface and a recess of a measurement depth in said flat support surface on said measurement surface with the recess in said measurement position, and then reading a calibration measurement.

6. Method of calibrating shot blasting test gage as claimed in claim 5, wherein said flat support surface and said flat zero datum surface are the same surface.

7. Method of calibrating shot blasting test gage used to measure intensity of shot blasting against an elongated test strip, said gage including a stand carrying a platform defining a measurement surface supporting said test strip in a measuring position, locating means placed on said test surface for locating said test strip in said measuring position, and an indicator mounted on said stand for measuring deflection of said strip at a measurement position within said measuring location, wherein the accuracy of the deflection measurement is a function of the accuracy of the indicator and the accuracy of placement of the locating means, comprising the steps of adjusting the calibration of the indicator to compensate for any inaccuracy of the locating means.

8. Method of calibrating shot blasting test gage as claimed in claim 7, wherein the calibration of the indicator is adjusted by placing a test member having a known deflection in said measurement position and then adjusting the indicator to read the deflection of the test.

9. Method of calibrating shot blasting test gage as claimed in claim 7, wherein a test member having an arcuate surface on one face thereof is placed on said measurement surface with the arcuate surface bridging across the measurement position, said arcuate surface establishing said known deflection.

10. Method of calibrating shot blasting test gage as claimed in claim 7, wherein said indicator is zeroed out against a flat zero datum surface placed on said measurement position before placing a test member having a known deflection in said measurement position and adjusting the indicator to read the deflection of the test member.

* * * * *